United States Patent [19]
Romero

[11] 3,788,613
[45] Jan. 29, 1974

[54] APPARATUS FOR THE EXTRUSION OF SYNTHETIC THERMOPLASTIC MATERIALS

[75] Inventor: Alfonso Torrecillas Romero, Badalona, Spain

[73] Assignee: Profiltex S. A., Badalona, Province of Barcelona, Spain

[22] Filed: Mar. 30, 1972

[21] Appl. No.: 239,658

[30] Foreign Application Priority Data
Apr. 3, 1971    Spain .................................. 389897

[52] U.S. Cl. ............................... 259/185, 425/201
[51] Int. Cl. .............................................. B29b 1/08
[58] Field of Search... 259/5, 6, 185, 187, 188, 189, 259/190, 194, 195; 425/201, 207, 209, 378, 379; 222/146 HE, 233, 236, 238, 414

[56] References Cited
UNITED STATES PATENTS

| | | | |
|---|---|---|---|
| 480,149 | 8/1892 | Thoens ........................... | 425/207 X |
| 1,892,583 | 12/1932 | Pine ............................... | 425/201 X |
| 2,174,319 | 9/1939 | Gastrow ........................ | 222/146 HE |
| 3,346,920 | 10/1967 | Fields................................ | 425/378 |
| 3,500,500 | 3/1970 | Capdevila .......................... | 425/378 |
| 3,632,091 | 1/1972 | Ford ................................. | 259/187 |

Primary Examiner—Harvey C. Hornsby
Assistant Examiner—Philip B. Coe
Attorney, Agent, or Firm—Woodhams, Blanchard & Flynn

[57] ABSTRACT

An extrusion apparatus for plastics material having wall means defining a chamber which diverges from the inlet to the outlet thereof. Two pairs of counter-rotating rollers are associated with the chamber and divide same into first and second series-connected accumulation chambers. The outlet of the accumulation chamber is in continuous and open communication with the inlet of a fusion chamber which converges from the inlet to the outlet thereof. An extrusion headstock is connected to the outlet of the fusion chamber and includes divergent walls which extend from the end of the fusion chamber to an extrusion gauge having plural orifices therein.

5 Claims, 1 Drawing Figure

PATENTED JAN 29 1974
3,788,613
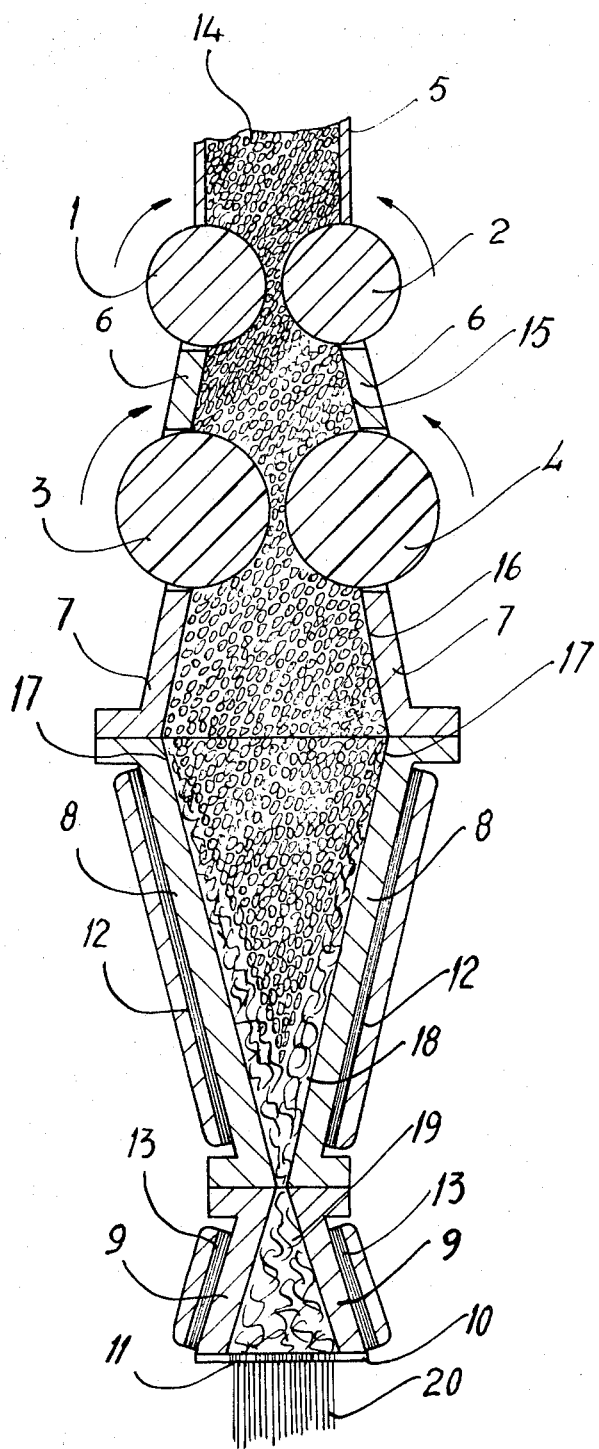

APPARATUS FOR THE EXTRUSION OF SYNTHETIC THERMOPLASTIC MATERIALS

This invention refers to an apparatus for the extrusion of synthetic thermoplastic materials.

Up to the present time for such purpose and the manufacture of filaments, an extrusion apparatus is used, whose primary construction is protected by the U.S. Pat. No. 3,500,500, issued on Mar. 17, 1970, in which the raw material is prepared in granular form and fed by a pair of fluted cylinders or feed rolls, whose coinciding flutes or grooves pinch the granulated material and force it towards the transormation or heating chamber, whereby the column of granules transported by the fluted rolls presses against the mass undergoing fusion within the chamber in order to eject same through the extrusion orifices.

In said form of known realization, a zone without heating - with parallel walls containing orifices for the escape of gases is provided between the cylinders and the fusion chamber, in which zone, owing to the pressure exercised by the cylinders against the extrusion orifices, the existing granular mass receives compression, and so is compressed as it advances toward the transformation or fusion chamber. Throughout the length and width of this zone, the column of granules pushed by the cylinders is braked by the walls of said zone owing to the compression. It has been verified in practice that if the area corresponding to the total sum of the areas of the outlet orifices is less than one third of the headstock extrusion area, and the cylinders are working at slow speed, or, delivering a reduced quantity of granular mass signifying low production in the extrusion apparatus, pressure is concentrated in the zone between the cylinders and the transformation or fusion chamber, causing compression of the granular material until it forms a compact block of material imprisioned between the walls, which thus renders difficult the advance of the column of granular material towards the transformation or fusion chamber. Moreover, the extrusion orifices form a very compact column which renders the cooling of same difficult to obtain solidification, whether by water or air currents.

In said known process, the necessity to employ very low extrusion pressures, of about 14 kgm per square centimeter, limits the velocity of the material that flows through the extrusion orifices, this being about five to ten cm/minute according to the number and area of orifices. For example, for a rectangular extrusion chamber of 500 mm. long by 20 mm wide, there ought to be 500 longitudinal and 20 transverse orifIces of 0.7 mm diameter, or 10,000 orifices. In this case the total outlet area comprises the sum of the single orifices which determines the quantity of material extruded. Said area will be about 38 square centimeters while the headstock extrusion area is 100 square centimeters, so does not reach the limited minimum acceptable and may be extruded at a prudent speed without exceeding the pressure limit accumulated in the extrusion orifices, and moreover, at a determined velocity said pressure may increase considerably according to the fluidity and viscocity of the material to be extruded.

As has been verified in practice, known machines present difficulties in the transformation or fusion chamber, if the granular material is not granulated slowly, so that as the heated walls are parallel, they must have a considerably higher temperature than that necessary in the material to melt same or convert it into the fluid state necessary for extrusion, which increased temperature in the extrusion chamber in relation to that desired in the material must become greater as the granular material speed increases through the chamber. The column of granular material that passes through the transformation or fusion chamber for conversion into the required state of fluidity, must remain in said chamber the time necessary for the heat to penetrate and melt the granules in the middle.

Owing tO the difficulties associated with the fusion, the extrusion chambers in known machines tend to be constructed as narrow as possible in order to facilitate the transmission of heat from its walls to the granules situated in the centre of the column of circulating granular material. But even so, an irregularity always exists in the temperature of the melted mass, causing irregularities in the fluidity of the material during extrusion which is unavoidable because those granules in contact with the walls receive more heat than those in the middle.

The irregularity in fluency of the material when passing through the extrusion orifices causes irregularity in the filaments produced, seeing that the hotter the material the greater the fluidity, so that a greater quantity can flow through the orifices in a given time.

In order to obtain coloured filaments, the colourant must be introduced together with the granular material, in spite of which homogeneity is impossible without passing through the extrusion orifices.

This invention refers to an extrusion apparatus that tends to attenuate the defects and disadvantages in apparatus for the extrusion of synthetic thermoplastic materials as known up to the present day.

This new apparatus comprises feeding elements of the synthetic thermoplastic polymers in granular, fragment or dust form by means of two cylinders or rolls rotating in opposite directions, said rolls being adequately grooved or smooth according to the material to be carried, whereby the separation between said rolls determines the amount of material conveyed by each revolution of the extrusion apparatus, immediately followed by a zone of equal length of the rolls, whose walls are transversely divergent the one from the other according to the direction of the passing material, the convergent part being adjusted to the surface of said rolls to prevent escape of any material. At the other extremity transversal of the walls, at the divergent part, there are also another two rolls or cylinders adjusted to same, equal to each other, also with parallel axes and driven in opposite directions similar to the previous ones and for the same purpose may be grooVed or plain and kept at the necessary separation distance. The fact that the two pairs of cylinders may be grooved in any form when the synthetic thermoplastic polymers to be treated permit same, is to assure their greater material transport efficacy, for example, the surfaces must be smooth for polymers in dust form. The two sets of rolls may be of similar or different diameter, the essential matter being that their velocities may be varied independently at will when working according to the theoretical amount of material transported and to the characteristics of the material thereby transported. As previously explained, the amount of material transported is equal to the separation between the rolls multiplied by their unrolling, the total amount transported is related to the length of the two sets of rolls which may vary according to the production capacity required from each extrusion machine, but the amount of material fed by two co-operating cylinders working alone is only theoretical. Said quantity of material would be real if upon being deposited on the entrance surfaces of the two co-operating cylinders no resistance were offered at the outlet, by the fact that at the entrance the pressure only corresponding to its own gravity is exercised. In order to avoid this inconvenience, the accumulation chamber of the transported material is situated between the two pairs of cooperating cylinders, with its walls transversely divergent in the moving direction of the transported material.

The advantage obtained from the accumulation chamber of the transported material is to assure that nothing moves back or is retained in the space between the two second cooperating cylinders due to the pressure effect at the outlet. In order to facilitate the process, and as an example, the following details are given: the mission of the first cooperating rolls is to introduce the transported material into the accumulation chamber; once the chamber is full of material at the convenient pressure limit, the second cooperating rolls enter into action carrying the material to the fusion chamber through a new accumulation chamber. The first accumulation chamber between the two sets of cooperating rolls that are in contact with the second at the side of their divergent parallel walls, tend to prevent the return of the material that is accumulated and has to be dragged by this second set of cooperating rollS. If upon the mass conveyed by these rolls along the extruder meets with great resistance due to the accumulated pressure, the mass suffers no alteration as to its quantity transported, owing to the constant pressure of the mass at the entrance of same, because simultaneously the first set of rolls introduces the material into the accumulation chamber, the advance of same being very easy and return impossible owing to the taper being in the direction favouring the movement offered by the walls of tbe accumulation chamber which are divergent in the movement direction of the material. The sole mission of the first rolls is to introduce the material into the accumulation chamber and keep the pressure relatively low, so that no possibility exists for the material conveyed to meet any retention, always provided that the speed and unrolling be adequate, from which it is clearly seen that the material transported by the rolls situated at the ends of the accumulation chamber and which is conveyed by same until arrival at the line terminal where the extrusion orifices are to be extruded by same, previously passing through the second accumulation chamber, the fusion chamber and the extrusion headstock; in spite of the high pressure formed within said zones, necessary pressure to obtain optimum extrusion, should be conveyed with the maximum constant regularity and is conveyed in this manner owing to the regular and constant pushing action of said rolls.

The second material accumulation chamber has divergent walls also in the moving direction of the material, being adjusted at the convergent wall side to the surface of the second pair of cooperating rolls, and by the divergent wall side united to the fusion chamber. This chamber offers the advantage that the material contained therein is very highly compressed, but in spite of same is easily conveyed to the interior of the fusion chamber by the rolls which have not to realize great effort.

The fusion chamber is also rectangular but its walls converge transversely in the movement direction of the material. On the divergent wall side it is united to the second material accumulation chamber, and on the convergent wall side joined with the extrusion headstock. Said chamber is provided with adequate heating elements to conveniently transmit the necessary temperture. Although the canal that forms its walls on the convergent side is about twenty times smaller than on the divergent side, this proportion may vary within acceptable limits and also obtain satisfactony results.

The walls of the chamber receive from the heater the heat necessary to melt the material and give it the necessary fluency, this operation being very easy owing to the strong pressure exercised by the material against the chamber walls, all that remains necessary to do is therefore to assure that said walls maintain constantly the degree of temperature that the material has to receive, seeing that when this makes contact with the walls it is immediately melted and slides between the walls and the non-melted material towards the extrusion headstock, simultaneously, other non-melted material makes contact with the walls repeating the operation, and so successively the material is melted at the exact temperature required. ThiS operation does not offer the inconvenience that the walls are at a higher temperature than that required for the melted material. Moreover, there is the advantage that when the melted material slides towards the extrusion headstock as previously stated, a turbulence is produced during the run that in consequence originates a substantial mixture of the flow. Also, the sliding flow by both walls towards the headstock is reunited before arriving at same, producing an intermixture at the crossing point, thus resulting in a substancially uniform flow at the required temperature.

The walls of the extrusion headstock are divergent in the movement direction of the flow, and in the divergent part the line with the corresponding extrusion orifices is situated. The headstock extrusion inlet canal must be adapted to the outlet canal measurements of the fusion chamber, but the outlet canal may vary according to the outlet gauge. Heating elements transmit the heat to the walls of the extrusion headstock and are maintained at a constant required temperture equal to that previously given to the flow which has a determined uniform temperature as maintaine in the extrusion headstock walls, so that no fluency irregularity in the flow contained in the headstock, thus ratifying the advantage that the same amount of material flows through each orifice and all the filaments manufactured are of the same diameter or deniers thereby establishing the maximum regularity between them all. All these advantages of constant pressure and temperature and the large area of the outlet gauge, result therefore in the obtainment of a large number of filaments through the small diameter orifices of the extrusion outlet gauge. Moreover, being of small diameter, excessive drawing force is not necessary to obtain small diameter filaments or deniers. It is also important that the filaments are immediately cooled upon leaving the extrusion orifices by means of water, air or any other adequate means, as they are of small diameter and do not form a compact column of filaments. With the rectangular extrusion headstock of 500 mm length and 100 mm width, 500 longitudinal orifices and 100 transversal of 0.4 mm diameter are obtained, or a total of 50,000 orifices or filaments. This corresponds to about 62 square centimeters and the area of the extrusion headstock surface 500 square centimeters. As already shown, the area corresponding to the extruded mass is about 12 percent of the extrusion headstock surface, which is attained owing to the efficacy and constant pressure exercised by the rolls against the extrusion orifices with the minimum force. This operation may be carried out because the transported material is not subjected to any retention until it arrives at the fusion chamber. With these advantages an extrusion apparatus may be constructed that is most suitable to the outlet gauge according to the product required and at a length of a meter or more.

In addition to all the foregoing advantages, textile fibres or filaments may be obtained in any colour by means of colourants in the fusion of the synthetic thermoplastic polymers, which may be pigments in dust, thermoplastic and premixed and also in premixed granules. Whichever form is used it must be mixed with the natural colour polymer before being fed to the extrusion apparatus. Owing to the turbulence produced by the flow between the walls of the fusion chamber and the unmelted material, and also to the reduction in area at the crossing of the two flows of material up to the surface of the outlet gauge, a substantially uniform mixture of polymer and colourant material is attained resulting in uniformly coloured extruded products. The invention and its advantages is described with more detail by the use of the figure in which a longitudinal cross section is shown of one realization of same as an example only, in which the cylinders 1, 2, 3 and 4 form the two pairs of cooperating rolls running in opposite directions as shown by the arrows; 5 shows the canal that conducts the material to the entrance of the first pair of cooperating rolls; 6 the walls of the first material accumulation chamber; 7 the walls of the second chamber thereof; 8 the walls of the fusion chamber; 9 the walls of the extrusion headstock; 10 of the extrusion gauge; 11 the extrusion orifices; 12 and 13 the heating elements; 14 the polymer synthetic thermoplastic in granular form, fragments or dust; 15 the polymer contained in the accumulation chamber between the two pairs of rollers; 16 the polymer compressed between the second set of rolls and the fusion chamber; 17 the point of initation of the pOlymer fusion; 18 the flow crossing point; 19 the polymer synthetic thermoplastic material in a state of fusion; and 20 the extruded filaments.

The functioning method is as follows: the set of cooperating cylinders 1 and 2 cause the synthetic thermoplastic polymer material in granular, frament or dust form conveyed to them by the canal 5 to be transported to the interior of the zone 15, where it is collected by the second pair of cooperating cylinders 3 and 4. The walls of the first material accumulation chamber 15 are adjusted to the surface of the respective cylinders 1, 3 and 2, 4 to prevent escape of material, and the peripheral velocity of the cylinders 1 and 2 is being variable at will with relation to that of the cylinders 3 and 4 so that in zone 15 the polymer material is obtained at the desired compression. Exercising a constant pressure, the compressed material present in the zone 15 - against the cooperating cylinders 3 and 4, and owing to the divergent position of the walls 6 which do not permit the return of the polymer synthetic thermoplastic material either in the form of granules, fragments or dust, the cylinders 3 and 4 transport in a regular manner the quantity of material required. The surfaces of the cylinders 1 and 2 as in 3 and 4 may be smooth or grooved as best desired according to the material employed. The walls 7 of, the second accumulation chamber 16 are adjusted to the surface of the cylinders 3 and 4. Owing to the divergent direction of the walls 7, the material is easily conducted at the desired pressure to the interior of the fusion chamber 18. The walls 8 of the fusion chamber are maintained constantly at the desired temperature by means of the heating elements 12, said pressure and temperature initiating the fusion of the polymer at the contact point 17 with the walls 8. The reduction of the area at the outlet of the fusion chamber with relation to the entrance to same obliges the material to press against the heated walls 8, thus obtaining a rapid fusion of the polymer, which upon conversion to a fluid, progressively increasing in velocity between the walls 8 and the polymer not fused, both fluids meeting at the crossing point 18. During displacement from the contact point 17 until the arrival at the crossing point 18, the flow has already acquired the temperature receive from the walls 8, then, this is transmitted to the nearest unmelted polymer met in the center of the fusion chamber and in the zone 16 effecting the preheating operation. As demonstrated, upon the flow displacement from the contact point 17 to the crossing point 18, a turbulence is formed that produces homogeneity in same, or, the flow upon making contact with the walls 8 had a higher temperature and therefore more fluidity, and arriving at the crossing point 18 has become mixed with that separated from the flows of less temperature and fluidity. Moreover, as the area of the crossing point is about five times that of the fusion chamber or extrusion headstock entrance, the flow receives a pull by pressure effected by a new mixture. All the foregoing demonstrates the advantages of this invention when possible to introduce, (in an extrusion headstock of rectangular form whose area may be up to 20 times or more at outlet in width and up to a metre or more in length) the flow of synthetic thermoplastic polymer of high homogeneity that permits a uniform and constant fluidity upon extrusion. Demonstrated also is the fact that owing to the homogeneity obtained before entering the extrusion headstock, the colouring of the polymer is easily obtainable during fusion. In the extrusion headstock the walls 9 are heated by heating elements 13 to a constant temperature equal to that of the polymer in state of fluidity proceeding from the fusion chamber. At the extremity of the extrusion headstock is situated the extrusion gauge 10 with its extrusion orifices 11 through which the filaments 20 are extruded. When said filaments are extruded with the necessary pressure, the orifices may be of reduced diameter thus facilitating the cooling operation at the gauge outlet by means of air, water or other method.

The invention within its essentiality may be realized in other forms and dimensions, all of which will be included within the spirit of the following claims:

1. An apparatus for the extrusion of synthetic thermoplastic material, comprising:
   means defining an entrance for material, a first accumulation chamber, a second accumulation chamber, a fusion chamber, and an extrusion headstock;
   means for feeding the material from said entrance to said first accumulation chamber, said last-mentioned means comprising two separate cylinders rotating in opposite directions;

means for feeding the material from said first accumulation chamber to said second accumulation chamber, said last-mentioned means comprising two separate cylinders rotating in opposite directions;

said means defining the fusion chamber including convergent wall means from an inlet to an outlet of the fusion chamber, and a heating source associated with the fusion chamber to bring the material to fluid conditions of viscosity and temperature homogeneity at the outlet of the fusion chamber; and said means comprising said extrusion headstock including divergent wall means from an inlet to an outlet of said extrusion headstock, and a heating source on the divergent wall means for maintaining the temperature of the fluid mass constant up to an extrusion gauge in the headstock outlet.

2. An apparatus according to claim 1, wherein the first and second accumulation chambers are each divergent from an inlet to an outlet thereof.

3. An apparatus according to claim 2, wherein the second accumulation chamber is united to and in open and continuous communication with the fusion chamber, the material in the second accumulation chamber acting as a pushing element for the material within the fusion chamber.

4. An apparatus according to claim 3, wherein the material to be melted acquires its fluid condition exclusively by remaining adjacent the convergent wall means of the fusion chamber.

5. An extrusion apparatus according to claim 4, wherein said convergent wall means of said fusion chamber includes opposed sidewalls which converge relative to one another as they extend in a direction from the inlet to the outlet of the fusion chamber, the material as melted within the fusion chamber sliding along the inner surfaces of both walls in a direction toward the headstock with the material sliding along both said walls being reunited as the melted material approaches the outlet of the fusion chamber for producing an intermixing of the melted material.

* * * * *